United States Patent

[11] 3,569,657

| [72] | Inventor | Melvin L. Levinson<br>1 Meinzer St., Avenel, N.J. 07001 |
|---|---|---|
| [21] | Appl. No. | 858,462 |
| [22] | Filed | Sept. 16, 1969 |
| [45] | Patented | Mar. 9, 1971<br>Continuation-in-part of application Ser. No. 497,851, Oct. 19, 1965, Patent No. 3,469,053. |

[54] METHOD OF PROCESSING AND TRANSPORTING ARTICLES
14 Claims, 6 Drawing Figs.

[52] U.S. Cl.................................................... 219/10.55,
219/10.75
[51] Int. Cl...................................................... H05b 9/06,
H05b 5/00
[50] Field of Search........................................... 219/104
(Inquired); 219/105 (Inquired); 219/214
(Inquired); 219/263 (Inquired); 219/98
(Inquired), 219/10.55

[56] References Cited
UNITED STATES PATENTS

| 2,293,316 | 8/1942 | Stebbins........................ | 98/6 |
| 3,083,284 | 3/1963 | Kamide......................... | 219/10.55 |
| 3,440,383 | 4/1969 | Smith............................ | 219/10.55 |
| 3,177,333 | 4/1965 | Lamb............................ | 219/10.55 |
| 3,277,580 | 10/1966 | Tooby........................... | 219/10.55X |
| 3,294,879 | 12/1966 | Jacobs........................... | 219/10.55X |
| 3,335,253 | 8/1967 | Jeppson et al. ................ | 219/10.55 |
| 3,429,359 | 2/1969 | Hollingsworth ............... | 219/10.55 |
| 3,451,401 | 6/1969 | Levinson....................... | 219/10.55 |
| 3,452,176 | 6/1969 | Levinson....................... | 219/10.55 |
| 3,469,053 | 9/1969 | Levinson....................... | 219/10.55 |

*Primary Examiner*—J. V. Truhe
*Assistant Examiner*—L. H. Bender
*Attorney*—John J. Lipari ABSTRACT: A method of processing and transporting articles from a first location to a second location, the articles being initially loaded in a movable transport vehicle, such as a tractor trailer, having a body portion which includes a microwave oven and an access opening capable of receiving microwave energy therethrough. The vehicle is transported to at least one microwave energy station whereat at least microwave energy is emitted through the access opening to heat the articles and where equipment can be employed to monitor and control the processing. The vehicle is then moved from the microwave generator station to a second location whereat the body portion is either stored or the heated articles removed therefrom.

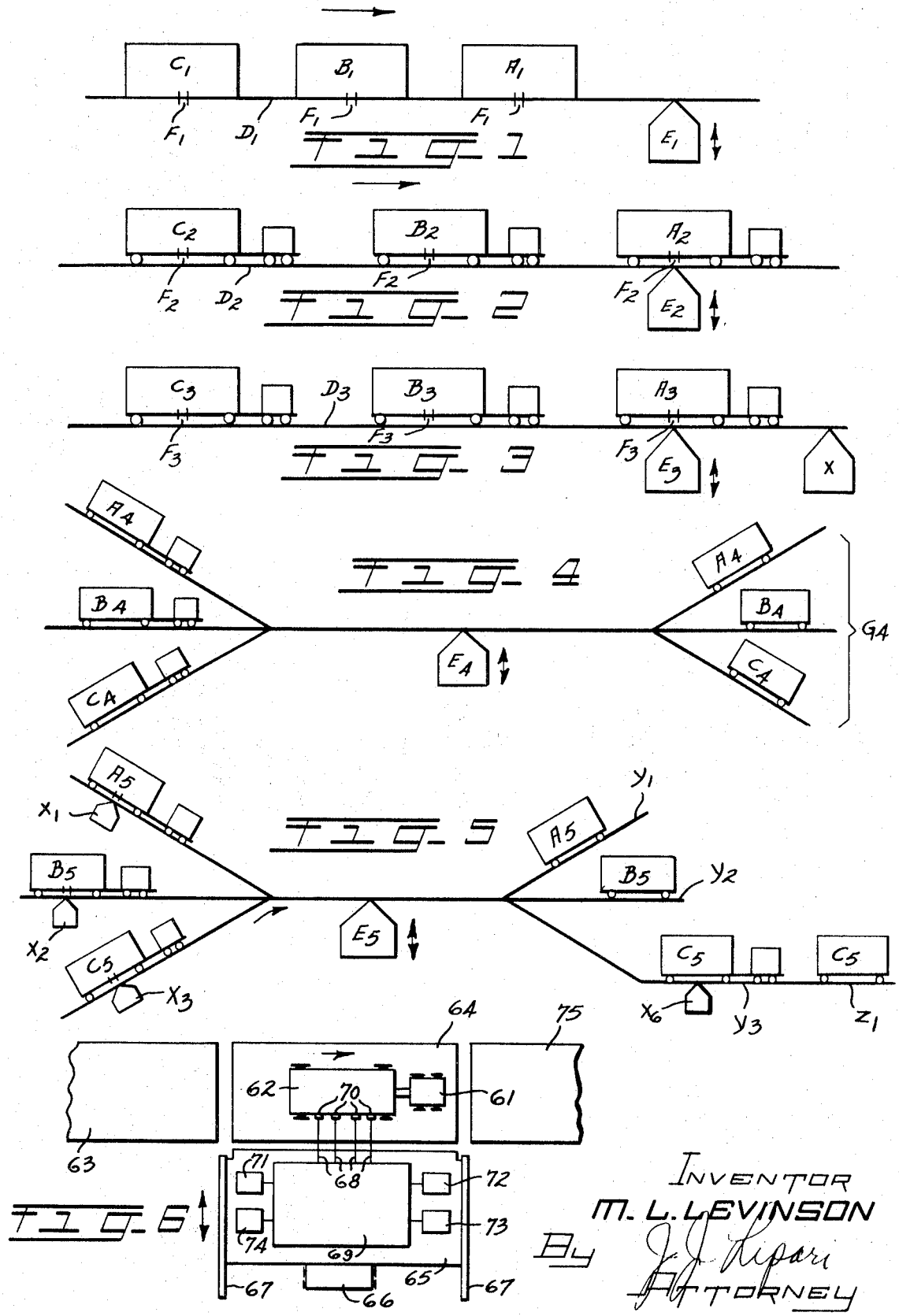

//3,569,657//

METHOD OF PROCESSING AND TRANSPORTING ARTICLES

CROSS-REFERENCE TO RELATED APPLICATIONS

This application is a continuation-in-part of my copending application, U.S. Ser. No. 497,851, filed Oct. 19, 1965 now U.S. Pat. No. 3,469,053.

BACKGROUND OF THE INVENTION

Heretofore, articles requiring heat processing, particularly at relatively high temperatures, are handled numerous times and subjected to ovens, furnaces and the like which are costly and require much space in processing facilities. For example, in the processing of ceramic materials, wetware is (1) loaded on racks and passed thru drying ovens, (2) then as greenware, unloaded, (3) reloaded on higher temperature racks, (4) passed through cumbersome tunnel kilns, (5) removed as bisqueware ware from the tunnel kiln and unloaded, (6) reloaded and moved to a storage area, and, (7) unloaded and reloaded onto a transport vehicle for shipment to a desired destination. Obviously, such a method is time consuming, space consuming, laborious, and costly.

Accordingly, it is an object of this invention to provide a processing and transporting method for articles which obviates the aforementioned undesirable deficiencies of the prior art.

SUMMARY OF THE INVENTION

Broadly, the invention relates to a method of processing and transporting articles during passage from a first location to a second location, the articles being loaded at the first location in a movable transport vehicle having a body portion which includes a microwave cavity and at least one access opening capable of receiving microwave energy therethrough. The vehicle is transported to a microwave generator station whereat the oven access opening is in spaced relationship to a microwave generator source. Microwave energy is emitted through the access opening and into the microwave oven to heat the articles therein. After emission of the desired microwave energy, the vehicles are transported to the second location, preferably a customer's destination whereat the heat processed articles are removed and utilized. During transport of the vehicles to the second location, sufficient time generally is available for continued processing as cooling the articles.

Specifically, the transport vehicle is a trailer, a railway car and the like which temporarily while connected with a microwave generator station takes the form of a large microwave oven. The cavity of the transport vehicle may be surrounded by heat insulating material as described in my aforementioned kiln application. Also, a plurality of such transport vehicles may be successively subjected to at least one common microwave generator station for receiving the necessary microwave energy for such processes as heating, cooking, drying, or firing of the articles.

BRIEF DESCRIPTION OF THE DRAWINGS

FIG. 1 is a schematic illustration depicting the invention disclosed in my copending application, U.S. Ser. No. 497,851, filed Oct. 19, 1965 now U.S. Pat. No. 3,469,053;

FIGS. 2, 3, 4 and 5 are schematic illustrations depicting various embodiments of the invention; and FIG. 6 is a top view illustration depicting a typical microwave generator station for drying and firing ceramics.

BRIEF DESCRIPTION OF THE PREFERRED EMBODIMENTS

With reference to FIG. 1 in the drawing, there is depicted schematically the system employed in my prior application, U.S. Ser. No. 497,851, now U.S. Pat. No. 3,469,053 for firing articles in microwave kilns (i.e. microwave cavities contained in a heat insulating material).

Briefly, a plurality of kilns or ovens $A_1$, $B_1$, $C_1$ etc. are transported successively by a conveyor belt $D_1$ to a microwave generator station $E_1$ which is capable of movement in a vertical direction. Upon transport of each successive kiln to the microwave generator station $E_1$, the latter is caused to move into contact with the kiln to emit microwave energy through an access opening $F_1$ and into the kiln to fire the ceramic articles therein. After firing the microwave generator is moved out of contact with the kiln and the kiln is transported along conveyor belt $D_1$ for cooling and removal of the fired articles therein, while a succeeding kiln is moved into position over the microwave generator unit for receiving microwave energy therein.

In FIG. 2, there is schematically illustrated a plurality of ovens or kilns of a type similar to the kilns in my aforesaid application Ser. No. 497,851 now U.S. Pat. No. 3,469,053 which take the form of tractor trailers $A_2$, $B_2$, $C_2$ etc., the latter being capable of travel over a roadway $D_2$ to a microwave generator station $E_2$ which is of similar structure and function to station $E_1$. The trailers of $A_2$, $B_2$ and $C_2$ are essentially large microwave ovens, each having an access opening $F_2$ extending preferably through the bottom surface thereof for receiving microwave energy therethrough. As each trailer is moved over the microwave generator station $E_2$, a desired amount of microwave energy is passed through microwave opening $F_2$ for a predetermined time to fire the articles therein.

The trailer ovens $A_2$, $B_2$, $C_2$, optionally, may contain shelves therein or "hot cubes," as described in my copending application, U.S. Ser. No. 704,389, which contain a plurality of resistive particles therein that are capable of converting microwave energy into heat energy. Also, with said shelves and hot cubes, a high degree of heat energy is stored therein and may be slowly released therefrom. Accordingly, the trailer ovens $A_2$, $B_2$, $C_2$ may be exposed to the microwave generator station $E_2$ for a relatively short time for partial processing and, during transport of the trailer, any stored heat therein may be released to fully process the articles. In this manner, (a) only a single microwave generator unit need be employed for a large number of trailer ovens, (b) cooling time on a conveyor line or the need for special cooling areas is eliminated since the articles may now be cooled while in the tractor trailers during delivery to the customers, (c) processing of the articles may occur during transport of the trailer and (d) storage of the fired articles in a warehouse or open storage area is eliminated, and handling of the articles minimized since the trailers function as ovens and transport carriers. It now is apparent that labor, factory facilities and time are greatly decreased, thereby resulting in a low cost, firing and transport system for articles requiring heat during processing.

While a truck transport system has been described, it is contemplated within the scope of this invention that other type transport media may be utilized. For example, railroad cars, in the form of microwave ovens, may be substituted for trailer ovens.

Typically, the railroad cars may be successively moved along a railroad track to a point whereat the microwave generator station, preferably located at a point between and below the tracks, is utilized for emitting the microwave energy through provided access openings in the railroad cars for firing or heating, as desired, the articles therein.

In another embodiment of the invention, as illustrated in FIG. 3, the transport tractor trailers $A_3$, $B_3$, $C_3$ or railroad cars may be conveyed to a first microwave generator station $E_3$ which operates at a relatively high power for firing articles. In the event it is desired, for an additional period of time, to sustain a firing temperature at some predetermined figure, (i.e. soaking) the trailer ovens or railroad car ovens are transported to a second microwave generator station X which operates at a relatively lower power and, in turn, emits a relatively smaller amount of microwave energy thereto. It takes appreciably more power to raise a ceramic to a high refractory heat than is necessary to sustain the heated ceramic at such a temperature.

At times, it may be desirable that a number of articles be fired and stored for a short duration of time. In such an event, as seen in FIG. 4, tractor trailers $A_4$, $B_4$, $C_4$ are loaded with the articles and transported to microwave generator station $E_4$ whereat the articles are fired. The tractor trailers then are transported to a storage area $G_4$ whereat the trailers are released from their tractors and stored until subsequently needed, the articles cooling therein during this time. It is apparent that handling of the articles is at a minimum and large factory systems employing space-consuming heating or firing apparatus is eliminated by the instant invention since the transport vehicles also function as microwave ovens which are capable of receiving the microwave energy from a common generator unit.

In another embodiment, as seen in FIG. 5, the tractor trailer ovens $A_5$, $B_5$, $C_5$, may each contain ceramic articles therein requiring different drying or preheating schedules prior to firing. For example, the articles in trailer-oven $A_5$ may be subjected to a predry at a 1,000-watt microwave generator $X_1$, prior to firing at master microwave generator $E_5$, e.g. 100,000-watts, and then transported to storage area $Y_1$ whereat the trailer-oven $A_5$ is stored, and the articles cooled therein for a desired period of time. Similarly, the articles in trailer-oven $B_5$ may require, and so be subjected to a predry at a 2,500-watt microwave generator station $X_2$, transported to master microwave generator $E_5$, fired, and then transported to storage area $Y_2$ whereat the trailer oven $B_5$ is stored and the articles cooled therein for a desired period of time. Likewise, the articles in trailer-oven $C_5$ may be subjected to a predry at a 5,000-watt microwave generator station $X_3$, transported to master microwave generator station $E_5$, fired, and then transported to area $Y_3$ whereat the ceramic articles in trailer-oven $C_5$ are soaked at high heat by a 10,000-watt microwave generator station $X_6$ for a predetermined processing time and thence trailer-oven $C_5$ is transported to storage $Z_1$ whereat, trailer-oven $C_5$ is stored and the article cooled therein for a desired period of time.

In FIG. 6, there is depicted a schematic plan view of a microwave generator station whereat a tractor 61 has pulled a trailer-oven 62 along roadway 63 onto weighing platform 64. At this point, trolley 65, motorized by prime conventional moving means 66, is moved into a position adjacent trailer 62 whereby connecting sensors 68–68 of program controller 69 engage mating couplings 70–70 on trailer 61, said sensors measuring the liquid, solid and gaseous conditions existing in the trailer-oven. In response to the measured conditions, program controller 69 causes the energization of required additive supplies to permit a flow of said additives into the trailer. For example, a gaseous supply 71 or solids supply 72 or liquid supply 73, such as steam, is energized to introduce any of the aforesaid supplies into the trailer to satisfy the particular conditions required for processing the articles. Simultaneously, a microwave emission supply 74 is energized for permitting the emission of microwave energy into the trailer through a bottom access opening of the trailer, as previously described, or through a side or top access opening of the trailer, if desired. After processing, the trailer is moved from the station to roadway 75, the station being then made ready for a succeeding trailer.

In firing ceramics, the composite microwave generator station illustrated in FIG. 6, would function as follows: (1) a load of wetware is loaded in trailer 62 from which samples of the wet clay have been taken; (2) a detailed analysis of the drying and firing characteristics of the clay samples is performed at a testing laboratory (not shown) on such equipment as Du Pont Model 950 Thermogravimeter Analyzer (TGA) attachment, a differential scanning calorimeter (DSC) cell attachment, and Model 900 Differential Thermal Analyzer (DTA), E.I. du Pont de Nemours & Co., Inc., Wilmington, Del., and where the moisture content is determined; (3) from the test results, optimum firing schedule and atmosphere requirements are formulated and the information fed to a programming device in controller 69; (4) trailer 62 is transported on roadway 63 to a fixed location on weighing scale platform 64 where its couplings 70–70 are mated with program sensors 68–68 of controller 69, which is moved by moving means 66; (5) Sealing plugs (not shown) and of a type set forth in my aforementioned patent application U.S. Ser. No. 497,851, now U.S. Pat. No. 3,469,053 are removed from microwave access openings (not shown). Microwave source 74 is energized causing microwave energy to pass through said access opening and into trailer 62 to dry the wetware; (6) the heated waste air that was used to cool the magnetron supplying microwave energy is directed thru said access openings into the trailer 62 to mechanically carry off water vapor evolved from the wetware; (7) since the moisture content has been predetermined, the weighing scale 64 is employed to signal the end of the drying cycle (e.g. a workload of 10 tons having 2 tons of water therein cannot be fired until it weighs 8 tons); (8) when the clay is dry, the plugs removed in step 4 are reinserted; (9) the controller 69 then causes the microwave generator source to increase its power output to provide the heat necessary to fire the already hot greenware; (10) during the firing phase, controller 69, if required by the program formulated in step 2, introduces solids, liquids or gases into the microwave cavity; (11) when the thermostats (not shown) and sensors 68–68 of controller 69 signal the end of firing, trailer 62 is uncoupled from controller 69; and (12) tractor 61 moves trailer 62 off weighing scale 64 onto exit roadway 75 where, as the fired ceramic cools, it is delivered to a desired location.

While the aforementioned description pertains to the processing of ceramic, it is understood that other type articles may be processed and transported according to this invention. For example, the articles may range from the cooking of foodstuffs to the heating of industrial articles, such as firing of brick, the drying of woodstuffs and the annealing of glassware.

I claim:

1. A method of heating and transporting articles from a first location to a second location, which comprises:
    loading the articles at the first location in a motor-operated vehicle having a body portion which includes a microwave cavity and an access opening capable of receiving microwave energy therethrough;
    driving the motor-operated vehicle to a microwave generator source whereat the access opening is in spaced relationship thereto;
    emitting microwave energy through the access opening and into the microwave cavity to heat the articles therein; and
    driving the motor-operated vehicle from the microwave generator source to the second location.

2. A method, according to claim 1, wherein the articles are cooled during movement to the second location.

3. A method, according to claim 1, wherein the body portion and articles therein are stored at the second location.

4. A method, according to claim 1, wherein the articles are removed at the second location.

5. A method, according to claim 4, wherein the motor-operated vehicle is the trailer portion of a tractor trailer.

6. A method, according to claim 4, wherein the motor-operated vehicle is a railway car.

7. A method, according to claim 4, wherein the motor-operated vehicle is driven from the microwave generator source to a second microwave generator source whereat the cavity receives additional microwave energy, prior to further movement to the second location.

8. A method, according to claim 4, wherein a plurality of resistive particles is loaded into the oven with the articles, said particles converting microwave energy into heat energy for providing additional heat to the articles during processing and transport to the second location.

9. A method, according to claim 4, wherein the microwave cavity is contained within heat insulating material.

10. A method, according to claim 4, wherein a plurality of motor-operated vehicles are successively driven to the microwave energy source for receiving microwave energy to heat the articles in said vehicles.

11. A method, according to claim 4, wherein processing conditions within the microwave cavity are constantly monitored.

12. A method, according to claim 11, wherein required additives are introduced into the microwave cavity responsive to said monitoring of the processing conditions.

13. A method, according to claim 5, wherein each of the body portion cavities is initially subjected to a first preheat microwave generator source for receiving a desired quantity of microwave energy therein for preheating the articles prior to successive movement of the motor-operated vehicles to the first mentioned microwave generator source.

14. A method, according to claim 13, wherein each of the body portion of the motor-operated vehicles is stored at a storage area for various cooling periods of time.